US007671507B2

(12) United States Patent
Schach et al.

(10) Patent No.: US 7,671,507 B2
(45) Date of Patent: Mar. 2, 2010

(54) BRUSH BAG FOR A DYNAMO-ELECTRIC MACHINE

(75) Inventors: Rainer Schach, Berlin (DE); Joerg Skrippek, Priort (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 795 days.

(21) Appl. No.: 10/586,435

(22) PCT Filed: Jan. 28, 2005

(86) PCT No.: PCT/EP2005/050363

§ 371 (c)(1),
(2), (4) Date: Jul. 17, 2006

(87) PCT Pub. No.: WO2005/074079

PCT Pub. Date: Aug. 11, 2005

(65) Prior Publication Data

US 2009/0021103 A1 Jan. 22, 2009

(30) Foreign Application Priority Data

Jan. 28, 2004 (DE) ....................... 10 2004 004 275

(51) Int. Cl.
*H02K 13/00* (2006.01)

(52) U.S. Cl. ......................... 310/242; 310/239; 310/245

(58) Field of Classification Search ................. 310/239, 310/238, 241, 242, 245, 248, 251
See application file for complete search history.

(56) References Cited

U.S. PATENT DOCUMENTS

| | | | | |
|---|---|---|---|---|
| 2,430,279 | A | 11/1947 | Duryee | |
| 3,784,856 | A * | 1/1974 | Preston | 310/239 |
| 3,955,113 | A * | 5/1976 | Hillyer et al. | 310/245 |
| 3,983,432 | A | 9/1976 | Rankin | |
| 5,793,141 | A | 8/1998 | Simonsen et al. | |
| 6,559,571 | B1 * | 5/2003 | Klode | 310/241 |
| 2003/0127941 | A1 * | 7/2003 | Otani et al. | 310/252 |

FOREIGN PATENT DOCUMENTS

| | | |
|---|---|---|
| DE | 560 231 | 9/1932 |
| DE | 885 748 | 8/1953 |
| DE | 971 394 | 1/1959 |
| DE | 88 11 775 U1 | 7/1989 |

(Continued)

OTHER PUBLICATIONS

International Search Report PCT/EP2005/050363.

*Primary Examiner*—Quyen Leung
*Assistant Examiner*—Leda Pham
(74) *Attorney, Agent, or Firm*—James E. Howard; Andre Pallaples

(57) ABSTRACT

A brush bag, a brush and a current transfer unit for a dynamo-electric machine comprising a commutator, in particular for an electromotor. The current transfer unit comprises at least the brush, which is embodied, in particular, as a multi-layer carbon brush, and a brush bag. The brush bag is configured in such a manner that the distance between the brush and the brush bag in a front guiding area is smaller than the distance in a rear guiding area. Beating of the brush on the brush bag is visibly reduced due to the configuration thereof and noise caused by the beat is avoided.

15 Claims, 8 Drawing Sheets

FOREIGN PATENT DOCUMENTS

| | | | |
|---|---|---|---|
| DE | 101 57 604 | | 6/2003 |
| DE | 10157604 | A1 * | 6/2003 |
| EP | 0 547 437 | | 6/1993 |
| FR | 857.613 | | 9/1940 |
| GB | 673977 | | 6/1952 |
| JP | 2003-23756 | | 1/2003 |

* cited by examiner

[Fig. 001]

[Fig. 002]
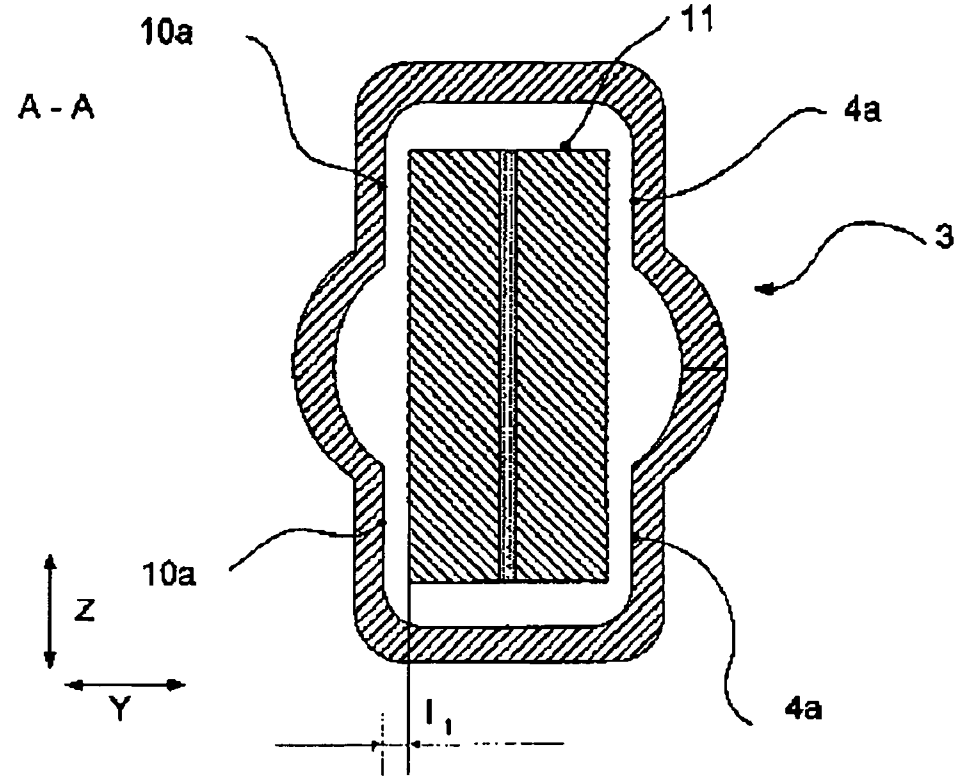
[Fig. 003]
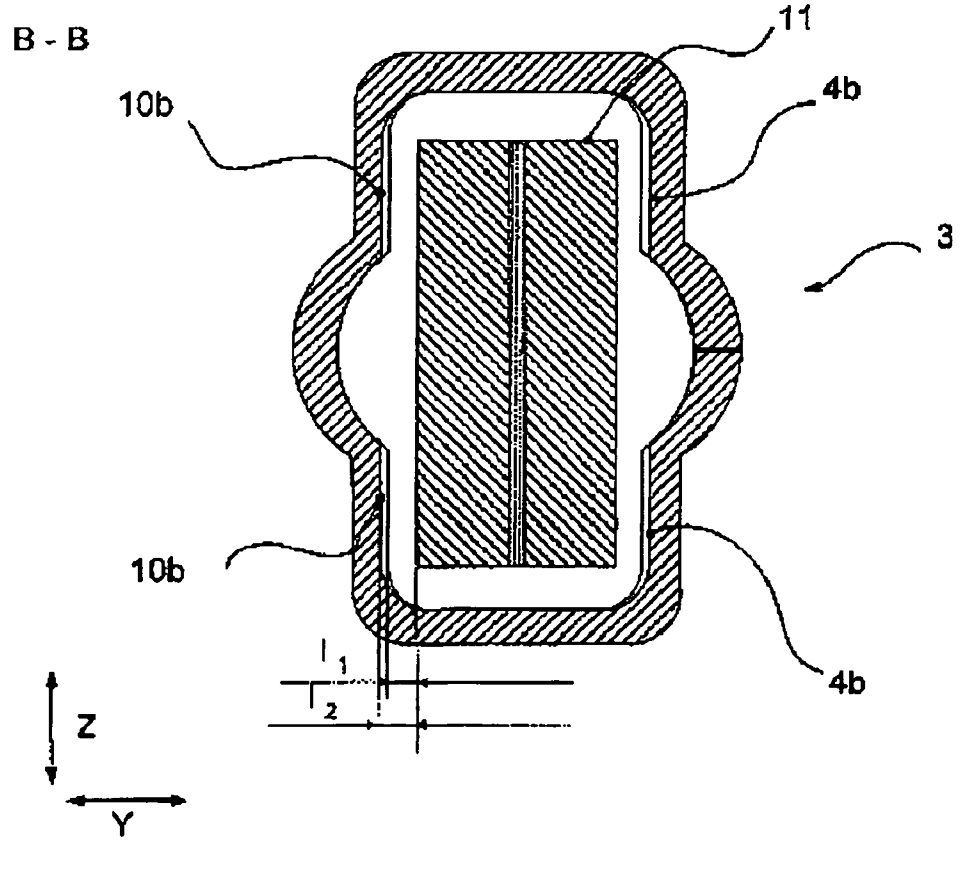

[Fig. 004]
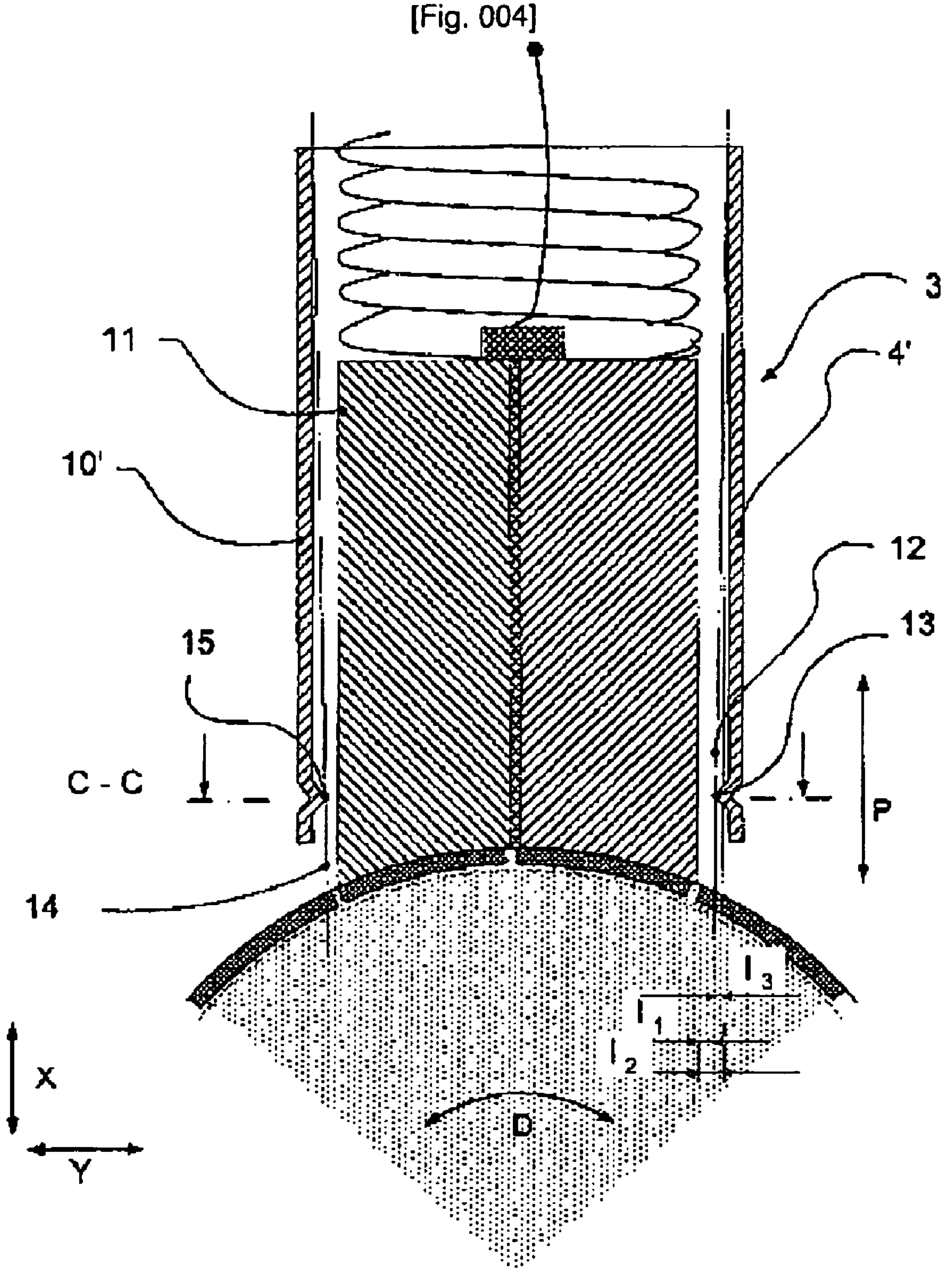

[Fig. 005]
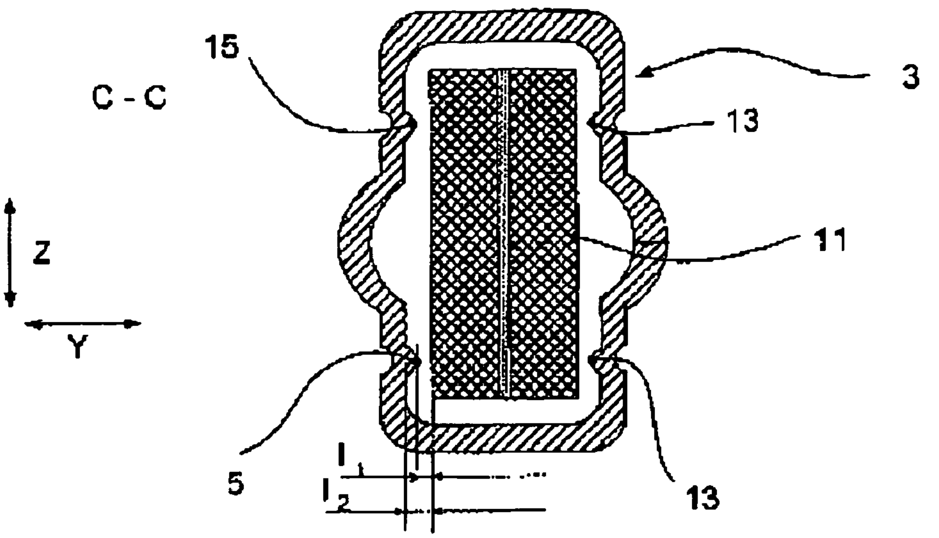
[Fig. 006]
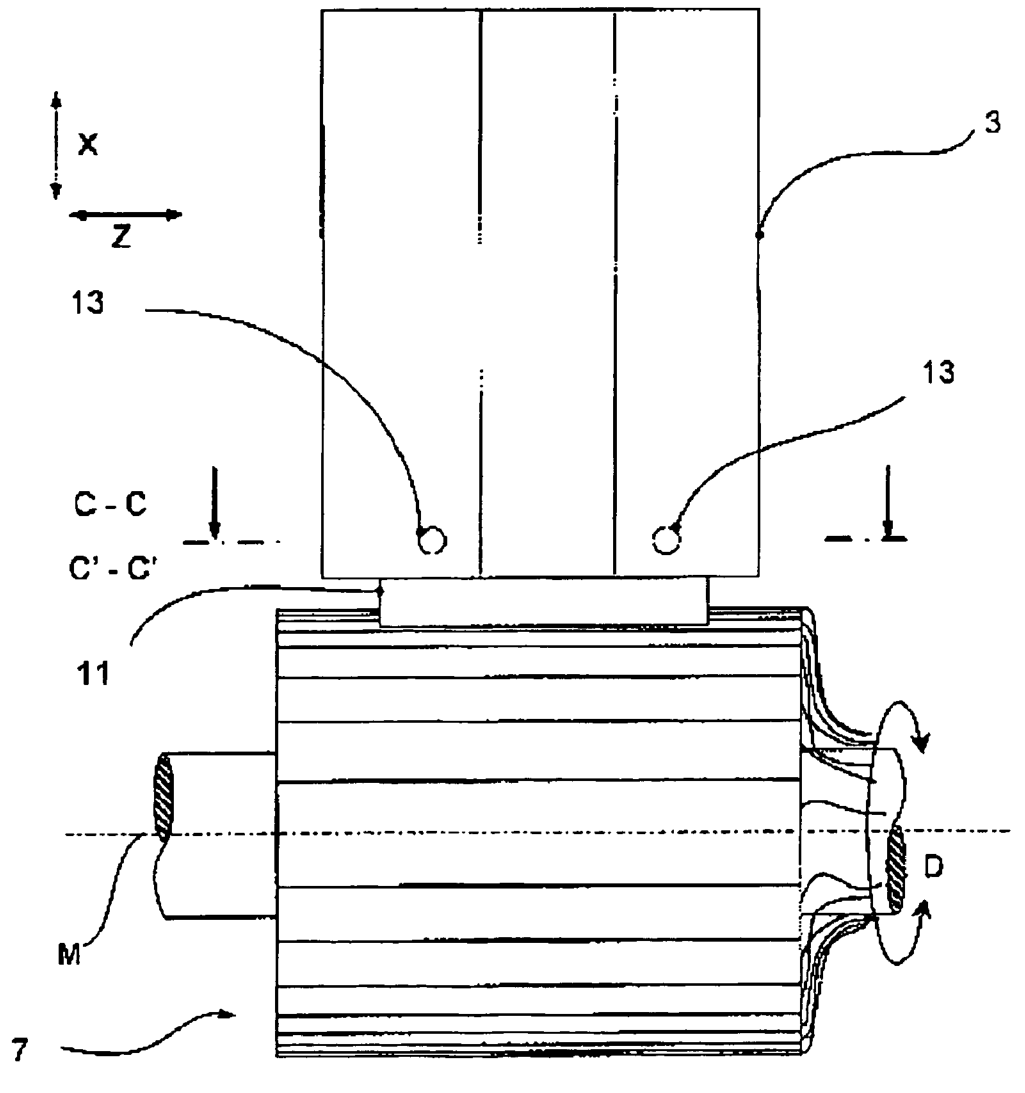

[Fig. 007]
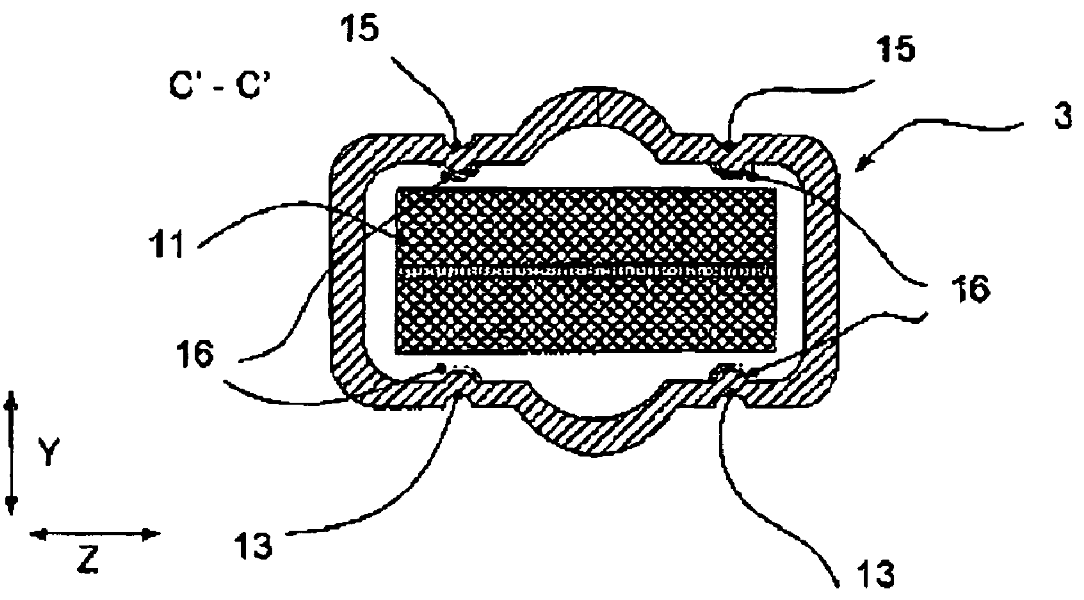
[Fig. 008]
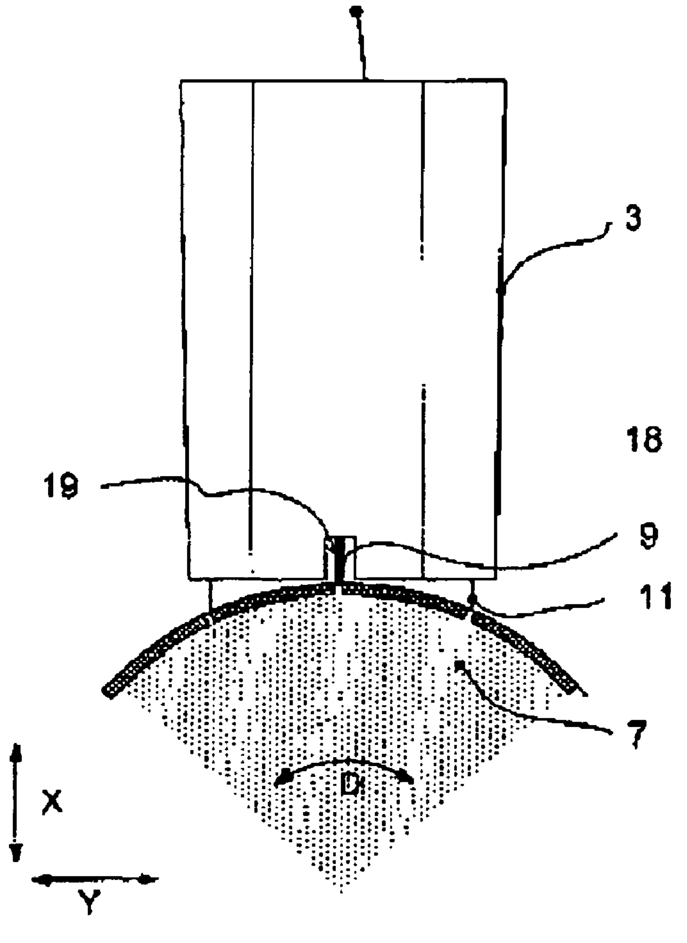

[Fig. 009]
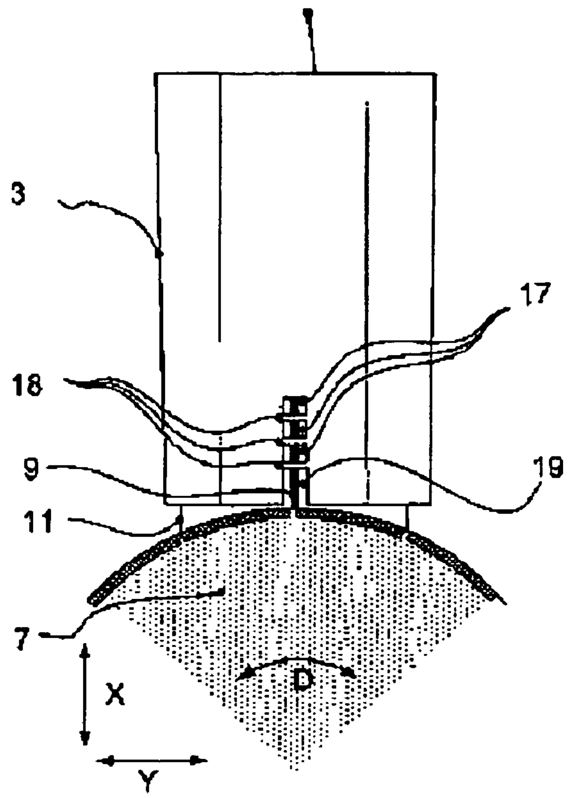
[Fig. 010]
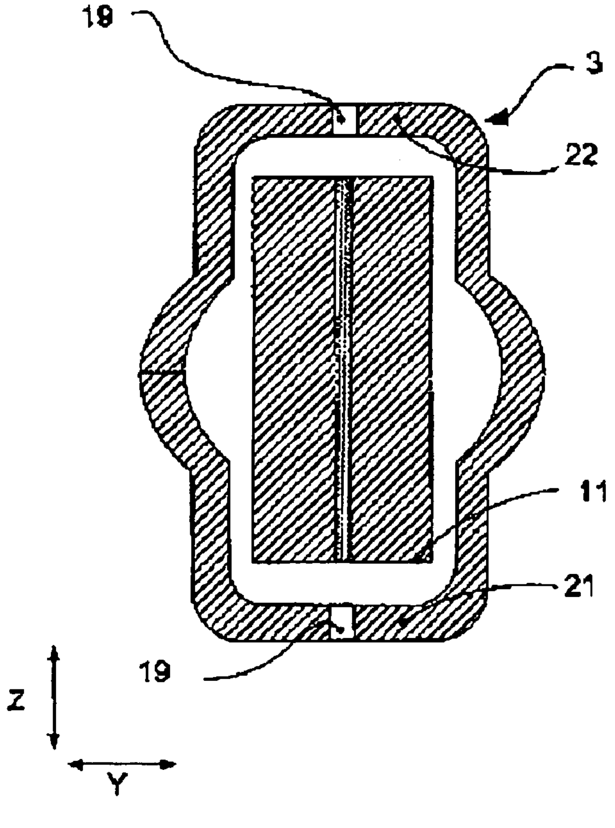

[Fig. 011]
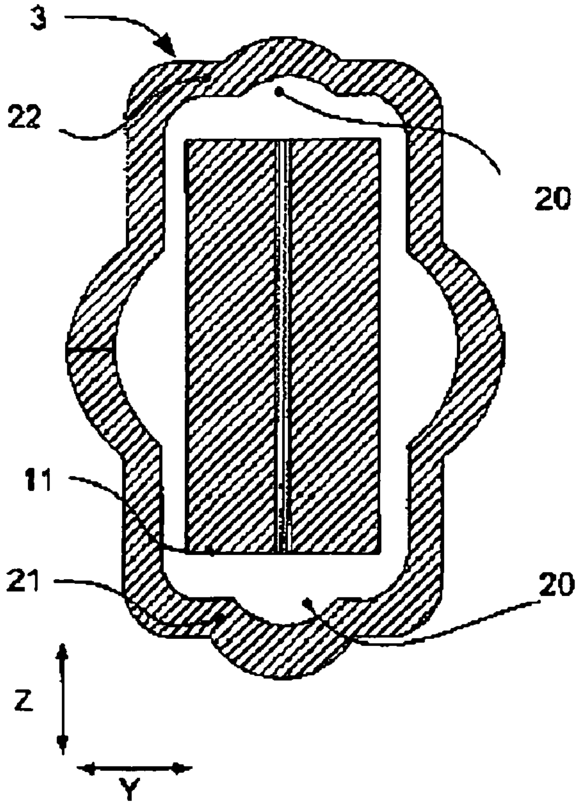
[Fig. 012]
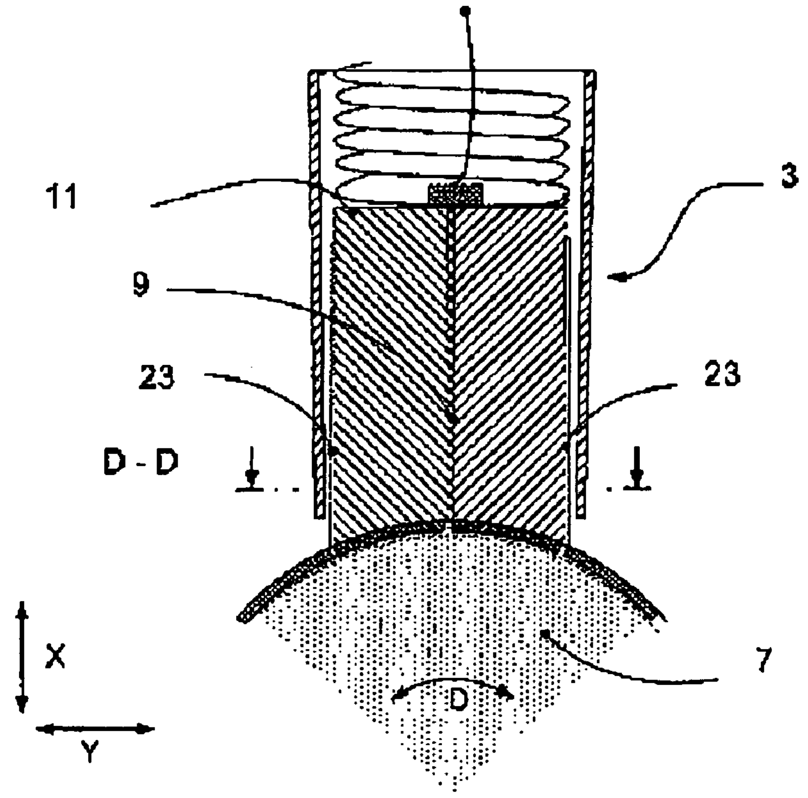

[Fig. 013]

BRUSH BAG FOR A DYNAMO-ELECTRIC MACHINE

BACKGROUND OF THE INVENTION

The invention relates to a brush bag for a current transfer unit of a dynamo-electric machine, comprising a commutator, especially for an electric motor, wherein the brush bag, which is especially made of metal, has guiding areas for guiding a brush which is displaceable with respect to the longitudinal extension, which is especially embodied as a multi-layer carbon brush, and a spacing is provided between the guiding areas and the brush transverse to the longitudinal extension of the brush. In addition, the invention relates to a brush for the brush bag, a current transfer unit for a dynamo-electric machine comprising the brush bag and/or the brush or a dynamo-electric machine comprising such a current transfer unit and a method for producing the brush bag.

The current transfer unit is a so-called sliding contact system which ensures the electrical connection between a power supply or external connections of the dynamo-electric machine and windings of an armature. For this purpose, in known dynamo-electric machines, such as electric motors an arrangement comprising spatially fixed brushes which usually consist of carbon and are in grinding contact with a rotatable commutator are provided. The commutator consists of individual electrically conducting segments which are connected to the windings of the armature. The brush slides along the segments to produce an electrical contact between the segments and the brush.

Different designs of current transfer units are known. One of these designs provides that a brush is slidingly guided in a spatially fixed brush bag which is also designated as a brush guide or brush sleeve. The brush is loaded with a spring in the direction of the commutator, that is in a radial direction. This ensures a substantially uniform contact pressure of the brush on the commutator. Likewise, the brush is tracked by means of the spring force inside the brush bag to compensate for any wear of the brush.

Especially in AC motors, for example, in AC universal motors, so-called multi-layer carbon brushes are used in the known current transfer units. The multi-layer carbon brushes have high-resistance or electrically non-conducting layers between individual carbon layers to reduce so-called shunt currents or short-circuit currents inside the brush. These shunt currents can occur if a brush is in contact with two adjacent segments of the commutator or if a brush or individual brush layers come in contact with an electrically conducting brush bag in such a manner that a current can be formed transverse to the brush. Electrically conducting brush bags, usually made of metal, are frequently used in dynamo electric machines as a result of their inexpensive manufacture. In order to avoid contact between the brush and the brush bag, whereby a shunt current can form in the brush, these brush bags have a relatively large lateral play between the brush and the brush bag. For example, a carbon brush of an AC universal motor of a washing machine is usually 0.04 to 0.05 mm narrower in its transverse extension than the inner guiding area of the carbon brush bag allocated in this transverse extension. In the case of a carbon brush located centrally in the carbon brush bag, the relatively large play between the carbon brush and the carbon brush bag in such a case is therefore 0.02 to 0.025 mm on both sides.

Whilst the brush is used as prescribed, the brush undergoes wear whereby it is abraded. The brush dust thereby produced enters between the brush and the brush bag. In order that the brush cannot jam as a result of the brush dust in the brush bag or so that no shunt currents are induced in the brush by the partially unburned and therefore electrically conducting dust particles, a large lateral play between the brush and brush bag is also favourable. Dust particles which enter into the intermediate space between the brush and the brush bag can easily escape again if there is a large play.

A disadvantage with the large play is that noise is produced during operation of the dynamo electric machine. As soon as the brush impinges upon a segment edge, the brush impacts against the inner walls of the bag. In this case, the brush impacts twice per segment.

A known solution for avoiding noise provides that the commutator surface provided with segments should additionally be treated by so-called pumices or fine grinding. During after-treatment of the commutator, dust particles are again formed which must be laboriously removed so that these dust particles cannot cause a brush jam again.

A brush bag which is especially suitable for guiding multi-layer carbon brushes and which has a spacing transverse to the carbon brush to be guided is known from DE 101 57 604 A1. The brush bag is made of tin-plated steel sheet and is coated with an insulating layer. The insulating layer applied in the brush bag is used to avoid a short circuit current or shunt current between individual layers of a multi-layer carbon brush. A varnish such as phenol resin, epoxy resin or polystyrene varnish is applied as an insulating layer to the steel sheet of the carbon brush bag. When such insulation is used between the carbon brush bag and the multi-layer carbon brush, the intermediate space or the play between the brush bag and the carbon brush can have close tolerances. Such a narrow play avoids any impact of the carbon brush on the brush bag. A disadvantage with the small play is that the brush dust which enters into the intermediate space can deposit in the intermediate space whereby the brush jams in the brush bag or the layers of the brush are short-circuited by unburned brush dust. In addition, such an insulating layer cannot be subjected to such strong thermal and mechanical loading as a pure metal guide.

On the other hand, in the prior art according to U.S. Pat. No. 2,430,279, an arrangement is proposed whereby the brush is laterally pre-stressed towards a brush holder wall by means of a ball-spring element connected to the brush. A disadvantage with this design however is that the spring provided to track the brush inside the brush holder must have a significantly higher spring force than is the case in embodiments which provide a play between the brush and the brush holder. However, the spring force required to overcome the friction between the brush and the brush holder can result in higher wear of the brush on the commutator.

SUMMARY OF THE INVENTION

It is thus the object of the invention to configure a carbon brush bag and/or a carbon brush or a resulting current transfer unit for a dynamo electric machine in such a manner that a brush of the current transfer unit causes no noise and/or no shunt currents can be formed in the brush. Furthermore, a method for producing a corresponding brush bag is to be provided. At the same time, the current transfer unit should be configured to that no shunt currents are induced in the brush by the brush dust produced during operation or the brush cannot jam in the brush bag and on the other hand, the current transfer unit or its components should be cost-effective and simple to manufacture.

According to the invention, this object is achieved by the features of a brush bag, the equivalent of a carbon brush, the equivalent of a current transfer unit and the equivalent of a dynamo electric machine. Advantageous embodiments of the invention are represented by the features of the dependent claims.

It has proved to be particularly advantageous to configure the brush bag of a dynamo-electric machine with a commutator, wherein the brush bag has guiding areas for guiding a brush which is displaceable with respect to the longitudinal extension and a spacing is provided between the guiding areas and the brush transverse to the longitudinal extension of the brush, such that in a front guiding area facing the commutator, the distance in at least one longitudinal extension located transverse to the brush is shorter than the distance in a rear guiding area facing away from the commutator. Consequently, the play between the brush and the brush bag in the area facing the commutator can be restricted such that the brush is guided almost free from play in this area. Hitting of the brush against the brush bag when the current transfer unit is used as intended is prevented if the play is restricted in a direction tangential to the commutator. The play specified according to DIN 43008 for a current transfer unit can be adhered to or even fallen below. Any formation of noise by hitting of the brush can thus be effectively prevented. Experiments have further shown that in such an embodiment a large transverse play between the rear guiding area facing away from the commutator and the carbon brush can be present without the brush hitting against the bag during operation. The large play in the rear guiding area is advantageous since sufficient space for any accumulating brush dust is thereby provided. So-called jamming of the brush in the brush bag can thereby be effectively eliminated. Furthermore, as a result of this configuration of the brush bag, the current transfer unit can be easily assembled since the brush can easily be inserted in the brush bag when assembling the current transfer unit.

According to an advantageous embodiment of the invention, the brush bag has a crucial distance for guiding the brush in the front guiding area or a play between the brush and the brush bag which is at least 0.005 mm shorter in the front guiding area of the brush bag than in the rear guiding area. By means of this configuration, it is achieved that a sufficiently large play is provided in the rear guiding area of the brush bag whilst in the front guiding area the brush is guided almost free from play. Experiments have shown that a play at least 0.005 mm larger in the rear guiding area is sufficient to avoid jamming of the brush in the brush bag during operation in a dynamo electric machine.

In an advantageous embodiment of the invention, a guiding plane formed by the front and rear guiding area of a first wall of the brush bag is inclined with respect to a guiding plane formed by the front and rear guiding area of a second wall, wherein the second wall is opposite to the first wall. With this type of configuration, conventional manufacturing installations for brush bags can still be used since, for example, the slope according to the invention of opposite wall section of the brush bag can be produced by after-pressing of wall sections of guiding areas of conventional brush bags located parallel to one another. The brush bag can thus be manufactured in one piece.

Preferably, according to a further development of the invention, at least one wall of the brush bag which guides the brush axially or parallel to the axis of rotation of the commutator has at least one through hole and/or channel in a front area of the brush bag. By means of such an embodiment of the brush bag, it can advantageously be achieved that accumulating brush dust that enters into the front area of the brush bag escapes from the front area again simply and completely through the through hole and/or the channel.

In a further embodiment according to the invention, the through hole in the front area of the brush bag is embodied as a slot which is open at the end on the commutator side. This additionally promotes the escape of accumulating brush dust.

In an alternative further development of the invention, the through hole of the brush bag is configured as grid-shaped. As a result of such a configuration, a very large opening area can be achieved by means of a plurality of through holes in the brush bag without the stability of the brush bag being restricted by such through holes since the remaining webs between the through holes still have sufficient strength. Such a configuration of the brush bag is used for rapid escape of brush dust.

It has proved to be particularly effective that in a further development according to the invention, the front guiding area is formed by at least one formation of the brush bag directed towards the brush. Since in this type of configuration of the brush bag, the brush can only touch the guiding areas of the brush bag in a punctiform or linear manner, only small guiding surfaces of the brush bag are thus obtained. The friction between the brush and the brush bag is hereby significantly reduced so that only a small spring force is required to displace the brush. A smaller spring force at the same time causes a reduction in the wear on the brush.

According to an advantageous further development, the inwardly directed formations of the front guiding area are embodied in the form of at least one bead and/or at least one knob. Such configurations can be produced particularly simply, for example by embossing. In this embodiment of the brush bag it is also advantageous that a relatively large play or distance between the brush and the brush bag is possible in the immediate vicinity outside the front guiding area of the brush bag thus formed. Consequently, brush dust particles which enter between the brush and brush bag can easily escape again.

In a further advantageous embodiment of the invention, the brush bag has a high-resistance or electrically non-conducting layer in the front guiding area. Any formation of shunt currents in the brush is avoided by such a layer. This has the result that the brush wear can be reduced during operation of the dynamo-electric machine and consequently the lifetime of the brush can be extended. In known insulated brush bags, such a layer extends over the entire guiding area of a brush bag. In contrast, a brush bag according to the further development of the invention can be produced more cost-effectively than the brush bags known hitherto since only the front guiding area of the brush bag has an electrically non-conducting layer.

The invention also relates to a brush for use in the brush bag according to the invention. The advantageous embodiment of the brush is characterised in that areas of the brush which can come in contact with the front guiding area during an intended use for operating a dynamo-electric machine, have a high-resistance or electrically non-conducting layer. Such a layer can prevent the formation of shunt currents. Since only partial areas of the brush need to have the electrically non-conducting layer, insulating material can be saved compared with brushes coated over the full area.

In an advantageous further development of the invention, the electrically non-conducting layer consists of an insulating varnish. Such a varnish can be simply applied to the brush, making the brush only insignificantly more expensive.

The invention further relates to a current transfer unit which advantageously contains at least one brush bag according to the invention and/or a brush according to the invention. The invention also relates to a dynamo electric machine comprising such a current transfer unit, a brush bag according to the invention and/or a brush according to the invention. Such a current transfer unit or such a dynamo electric machine in the form of an AC universal motor can be used particularly advantageously in a washing machine since these devices must be operated with low noise, wherein components which are as inexpensive as possible, for example, a drive motor with a current transfer unit according to the invention, are used to produce the washing machine.

The invention further relates to a method for manufacturing a brush bag according to the invention, wherein in addition to a step for producing a brush bag, the method advantageously comprises a further step in which the brush bag is after-pressed or embossed in an area of the front guiding area so as to form a brush bag wherein the distance from a brush to be guided in at least one longitudinal extension located transverse to the brush in a front guiding area of the brush bag is shorter than in a rear guiding area.

BRIEF DESCRIPTION OF THE DRAWINGS

The invention and its advantageous embodiments are described in detail hereinafter with reference to exemplary embodiments and schematic drawings which are not to scale. In the figures:

FIG. 2 is a transverse section A-A of the current transfer unit in a front guiding area, FIG. 3 is a transverse section B-B of the current transfer unit in a rear guiding area, FIG. 4 is a section through the current transfer unit with formations of the brush bag directed towards the brush to form a front guiding area, FIG. 5 is a transverse section C-C through the current transfer unit with formations of the brush bag directed towards the brush to form a front guiding area, FIG. 6 is a side view of the current transfer unit with formations of the brush bag directed towards the brush to form a front guiding area, and a side view of the commutator, FIG. 7 is a transverse section C'-C' of a current transfer unit in a front guiding area, wherein the brush bag has an electrically non-conducting layer in the area of the front guiding area, FIGS. 8 and 9 are side views of current transfer units with a brush bag provided with lateral through holes and a section through the commutator, FIG. 10 is a transverse section through a current transfer unit with a brush bag having a through hole, FIG. 11 is a transverse section through a current transfer unit with a brush bag having a channel, FIG. 12 is a section through a current transfer unit with a brush having electrically non-conducting layers on outer areas and FIG. 13 is a transverse section D-D through the current transfer unit with a brush having electrically non-conducting layers on outer areas.

DETAILED DESCRIPTION OF THE EXEMPLARY EMBODIMENTS OF THE PRESENT INVENTION

The description of the advantageous exemplary embodiment of the invention is made with reference to an application in an AC universal motor used to drive a rotatably mounted drum located in a laundry treatment appliance. However, the invention is not restricted to such a special design of a dynamo electric machine and the use of the machine in the laundry treatment device. Rather, the invention extends to current transfer units or brush bags and brushes which can be used in dynamo electric machines with a mechanical commutator.

Figure 1:
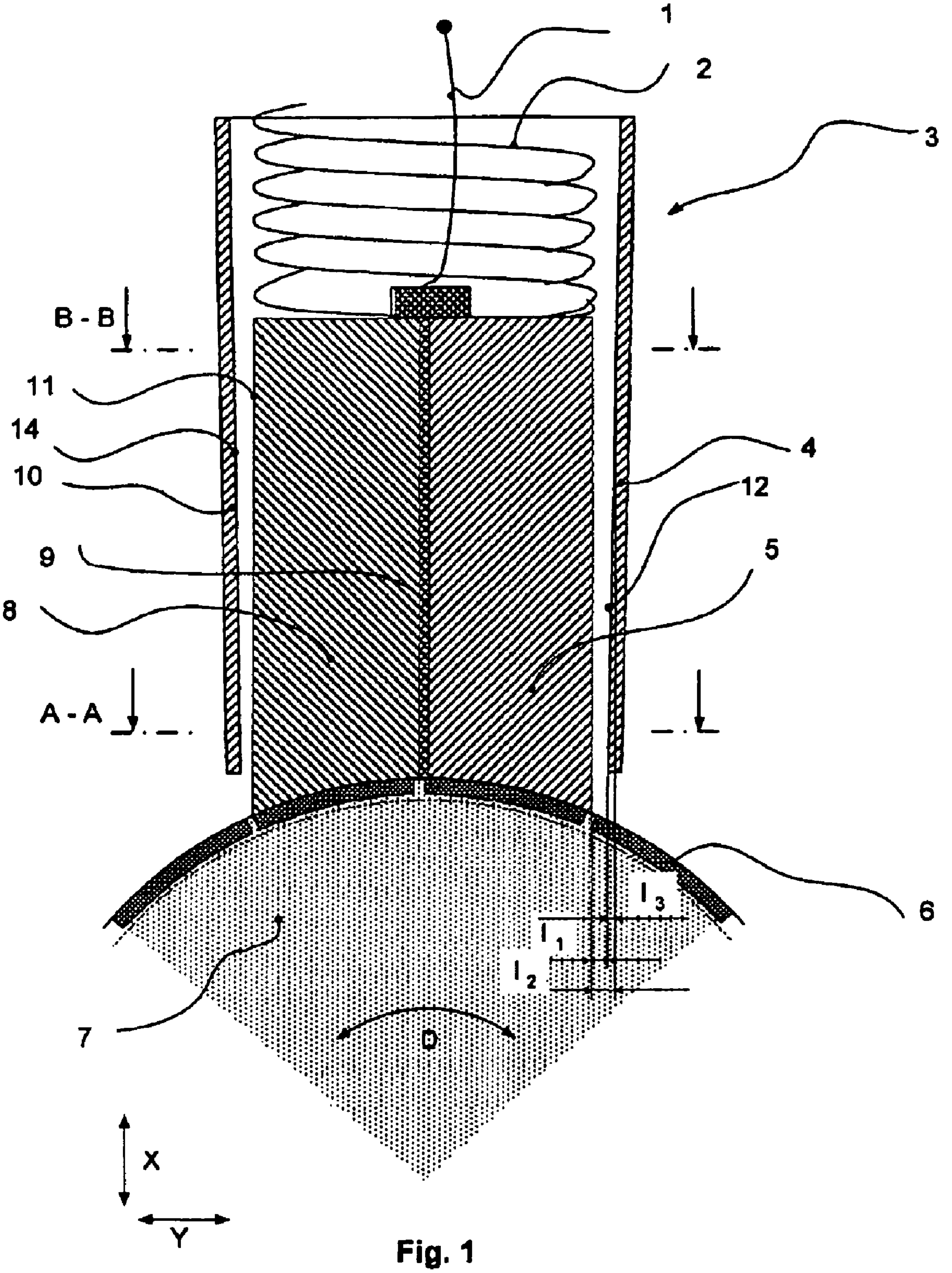
FIG. 1 is a section through a current transfer unit and a commutator of a dynamo electric machine with guiding areas inclined towards one another.

FIG. 1 shows a section through a current transfer unit and through a commutator 7 of an AC universal motor, not shown, which is hereinafter merely called the motor. The current transfer unit consists of a connecting lead 1, a multilayer carbon brush 11 which comprises two electrically conducting layers 5 and 8 and a high-resistance or electrically non-conducting layer 9 between these layers, a spring 2 and a fixed brush bag 3. The connecting lead 1 is connected to both layers 5 and 8 of the multilayer carbon brush 11 by a suitable common contact point. For simplicity the multilayer carbon brush 11 is hereinafter designated as the brush 11. The brush 11 is displaceable in its longitudinal extension, that is in the X direction, in the brush bag 3. The brush is pressed against the commutator 7 or against the segments 6 located on the commutator by means of a force produced by the spring 2. In addition, the spring 2 causes the brush 11 to be displaced subsequently in the X direction according to any operation-induced wear of the brush 11. During a rotation D of the commutator 7 which is fixedly connected to a rotor of the motor, the brush 11 slides over the segments 6 which are connected to individual windings of the rotor. Thus, an electrical contact is made between the brush 11 and the segments 6 or the windings of the rotor.

The brush 11 is guided by respectively two opposing inner walls of the brush bag 3 and at the same time, a spacing is provided between the brush 11 and the inner walls of the brush bag 3 in respectively one extension located transverse to the brush. The inner walls or areas of the inner walls of the brush bag 3 form so-called guiding areas. In the preferred embodiment shown in FIGS. 1 to 3, the walls 4 and 10 of the brush bag 3 are formed such that the distance $I_1$ between the brush 11 and the wall sections 4*a* and 10*a* in a front guiding area of the brush bag 3 is shorter than the distance $I_2$ between the brush 11 and the wall sections 4*b* and 10*b* in a rear guiding area, where the wall sections 4*a* and 4*b* form a guiding plane 12 and the wall sections 10*a* and 10*b* form a guiding plane 14. The front guiding area of the brush bag 3 is facing the commutator 7 and lies in a plane A-A. Accordingly, the rear guiding area of the brush bag 3 is facing away from the commutator 7 and lies in a plane B-B. A section in the plane A-A through the brush bag 3 and through the brush 11 is shown in FIG. 2 and a section in the plane B-B is shown in FIG. 3. As a result of a reduction in the distance or the play between the brush 11 and the brush bag 3 in the Y direction tangential to the commutator 7, hitting of the brush 11 against the brush bag 3 is reduced, a reduction in the play in the front guiding area of the brush bag 3 advantageously being sufficient. The invention is not restricted to such a special configuration of the brush bag 3 where the distance $I_1$ between the brush 11 and the brush bag 3 in the front guiding area in a direction tangential to the commutator 7 (Y direction) is shorter than the distance $I_2$ in the rear guiding area. The distance between the brush 11 and the brush bag 3 in the front guiding area in an axial direction (Z direction) located transverse to the longitudinal extension of the brush 11, can also be shorter than in a rear guiding area.

The carbon brush 11 of a motor of a domestic washing machine has a width (Y direction) of 5 mm in the present exemplary embodiment. It has proved to be particularly favourable to configure the brush bag 3 of such a carbon brush 11 such that the opening width of the brush bag 3 crucial for guidance in the front guiding area is 5.03 mm and is 0.02 mm smaller than in the rear guiding area. The distance $I_1$ in the front guiding area is thus 0.015 mm on both sides for a brush 11 located centrally in the brush bag 3 and the distance $I_2$ in the rear guiding area is 0.025 mm on both sides. Experiments have shown that during operation of the universal motor of the washing machine, the brush 11 hits significantly less against the brush bag if the distance $I_1$ crucial for guidance of the brush 11 in the front guiding area is reduced by at least 0.005 mm compared with the distance $I_2$ in the rear guiding area.

In a further preferred embodiment of the brush bag 3, the plane 12 of a wall of the brush bag 3 formed by the front and rear guiding area is inclined towards the opposite plane 14 formed by the front and rear guiding area of the opposing wall of the brush bag 3. In the case of the brush bag 3 shown in FIG. 1, the opposite walls 4 and 10 are embodied as straight so that the walls 4 and 10 are inclined with respect to one another.

The diagrams in FIGS. 8 and 9 show side views of brush bags 3 in two different advantageous embodiments, wherein a partial area of the commutator 7 is shown in a cutaway view in the diagrams. FIG. 10 shows a section through the brush bag 3 in a front or commutator-side area of the brush bag 3. In these embodiments through holes 17, 19 are provided in the commutator-side area of the walls 21 and 22 of the brush bag 3. The through holes 17, 19 are preferably incorporated in opposite walls which guide the brush 11 laterally or axially and lie in the Y direction. The brush dust which enters between the brush 11 and the brush bag 3 can escape again through these through holes 17, 19. This effectively avoids any jamming of the brush 11 in the brush bag 3 due to brush dust. In alternative embodiments, the through openings 17, 19 can also be provided in other walls of the brush bag 3. In the embodiments shown in FIGS. 8 and 9 the through opening 19 of the brush bag 3 is slot-shaped, being open at the end on the commutator side. In order to enlarge the opening area, further through holes 17 are incorporated in a grid shape in the front area of the brush bag 3, with webs 18 remaining between the through holes 17 and/or the through hole 19. As a result of these webs 18, the brush bag 3 retains sufficient stiffness.

In a further alternative embodiment of a brush bag 3 shown in FIG. 11, respectively one channel 20 is formed in the front or commutator-side area of the brush bag 3 in opposing walls 21, 22. In this case, FIG. 11 shows a section through the brush 11 and the brush bag 3 in a plane facing the commutator. The channels 20 are preferably incorporated in walls which guide the brush 11 axially and lie in the Y direction. Accumulating brush dust can escape again via these channels from the space between the brush 11 and the brush bag.

In the embodiment of the brush bag 3 shown in FIG. 4 to FIG. 6, in the area on the commutator side the brush bag 3 has formations 13, 15 directed towards the brush 11 on opposite walls 4' and 10' of the brush bag 3. The inner areas of the formations 13, 15 form front guiding surfaces or guiding areas for the brush 11. The formations 13 with the rear guiding area of the wall 4' of the brush bag 3 form the guiding plane 12 and the formations 15 with the rear guiding area of the correspondingly opposite wall 10' form the guiding plane 14. It this embodiment it is particularly advantageous that opposing walls of the brush bag 3 can be substantially parallel, wherein as a result of the formations 13, 15 the distance $I_1$ between the brush 11 and the front guiding area of the brush bag 3 is shorter than the distance $I_2$ between the brush 11 and the rear guiding area of the brush bag 3.

As shown in FIGS. 4 and 5, the brush bag 3 is manufactured such that the formations 13 and 15 of the brush bag 3 are knob-like. Alternative embodiments of formations of the brush bag 3, such as one or more beads, can also be used to form a front guide area.

In a further advantageous embodiment of the invention, in the area of the front guiding area the brush bag 3 has a high-resistance or electrically non-conducting layer 16 facing the brush 11. In the exemplary embodiment shown in FIG. 6, an insulating varnish is applied to the surface of the formations 13, 15 of the brush bag directed towards the brush 11.

Figure 13:
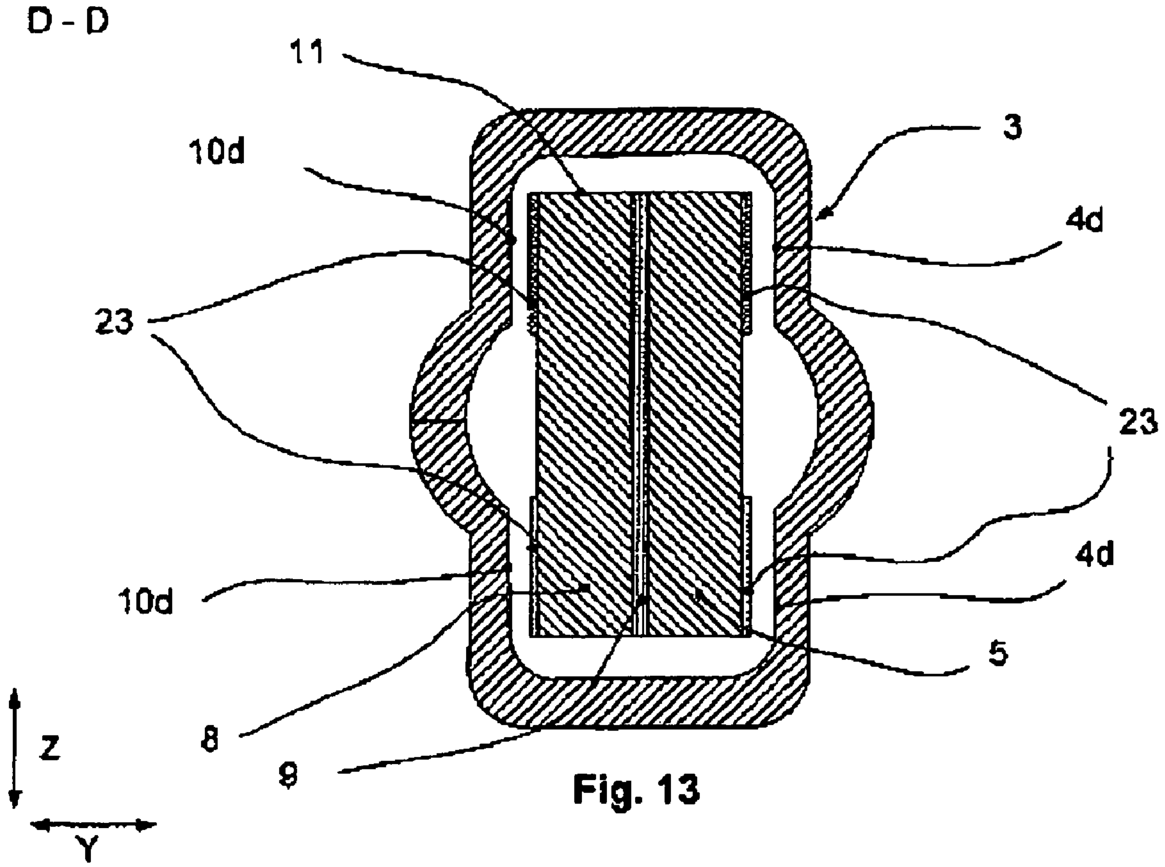

The diagrams in FIGS. 12 and 13 show an embodiment of a current transfer unit with a brush bag 3 according to the invention which has a shorter distance from the brush 11 in the front guiding area than in the rear guiding area, and a brush 11 which has a high-resistance or electrically non-conducting layer 23 or insulating layer 23. The electrically non-conducting layer 23 is restricted to areas of the brush 11 which can come in contact with the front guiding area of the brush bag 3 when used as intended. In the exemplary embodiment shown, an insulating varnish which consists of phenol resin, epoxy resin or polystyrene resin and which forms the insulating layer 23 is applied to areas of the brush 11 which can come in contact with the brush bag 3 in a direction Y located substantially tangentially to the commutator. In alternative embodiments of a brush 11, the insulating layer 23 can also be applied to areas which can come in contact with the front guiding area in another direction. In alternative embodiments of the brush 11, the insulation layer 23 can also be of a different type.

The embodiments of the brush bag 3 and the brushes 11 describe hereinbefore can be used individually or in combination in a current transfer unit of an AC universal motor. However, these embodiments can also be used in other dynamo electric machines which have a mechanical commutator or sliding contact system.

The brush bag 3 according to the invention is produced by stamping a semi-finished product from a metal sheet, making allowance for possible recesses such as the through holes 17 and 19. Such a semi-finished product is bent to form a brush bag with substantially parallel walls. Two end sections of the semi-finished product are fixedly interconnected by means of a so-called dovetail joint. In a further production step the brush bag thus produced is deformed in the front area in such a manner that the distance from a brush 11 to be guided in at least one longitudinal extension located transverse to the brush 11 in a front guiding area of the brush bag 3 is shorter than the distance in a rear guiding area. For this purpose, two opposite, predominantly parallel walls of the brush bag are pressed or after-pressed in a front area. By means of this production step the walls can be deformed so as to produce a brush bag 3 having walls inclined towards one another, as shown in FIG. 1. Formations directed towards the brush 11, as shown in FIG. 4 for example, can also be incorporated in the brush bag by means of such a production step.

The invention claimed is:

1. A brush bag for a current transfer unit of a dynamo-electric machine comprising a commutator, especially for an electric motor, wherein the brush bag, which is especially made of metal, has guiding areas for guiding a brush which is displaceable with respect to a longitudinal extension, which is especially embodied as a multi-layer carbon brush, and a spacing is provided between the guiding areas and the brush transverse to the longitudinal extension of the brush, wherein in a front guiding area of the brush bag facing the commutator, a first distance in at least one longitudinal extension located transverse to the brush is shorter than a second distance in a rear guiding area of the brush bag facing away from the commutator, wherein the front guiding area of the brush bag facing the commutator is in a first plane that lies at a first end of the brush bag facing the commutator, and wherein the rear guiding area of the brush bag facing away from the commutator is in a second plane that lies at a second end of the brush bag away from the commutator.

2. The brush bag according to claim 1, wherein the first distance for guiding the brush in the front guiding area is at least 0.005 mm shorter than the second distance in the rear guiding area.

3. The brush bag according to claim 2, wherein a guiding plane formed by the front and rear guiding area of a first wall of the brush bag is inclined with respect to a guiding plane formed by the front and rear guiding area of a second wall, wherein the second wall is opposite to the first wall.

4. The brush bag according to claim 2, wherein at least in a front area of the brush bag which is facing the commutator, at least one wall of the brush bag that axially guides the brush has at least one of a through hole and a channel.

5. The brush bag according to claim 4, wherein the through hole is embodied as a slot and the slot is open at the end on the commutator side.

6. The brush bag according to claim 4, wherein the through hole is embodied as grid-shaped.

7. The brush bag according to claim 3, wherein the front guiding area is formed by at least one formation of the brush bag directed towards the brush.

8. The brush bag according to claim 7, wherein the at least one formation is embodied in the form of at least one of a bead and a knob.

9. The brush bag according to claim 2, wherein the brush bag has an electrically insulating layer in an area of the front guiding area.

10. A dynamo-electric machine comprising:

a current transfer unit; and a brush bag comprising a commutator wherein the brush bag is made from a metal material and has guiding areas for guiding a multi-layer carbon brush which is displaceable with respect to a longitudinal extension of the brush, a spacing being provided between the guiding areas and the brush transverse to the longitudinal extension of the brush, wherein in a front guiding area of the brush bag facing the commutator, a first distance in at least one longitudinal extension located transverse to the brush is shorter than a second distance in a rear guiding area of the brush bag facing away from the commutator, wherein the front guiding area of the brush bag facing the commutator is in a first plane that lies at a first end of the brush bag facing the commutator, and wherein the rear guiding area of the brush bag facing away from the commutator is in a second plane that lies at a second end of the brush bag away from the commutator.

11. The dynamo-electric machine according to claim 10, wherein the brush comprises an electrically non-conducting layer being restricted to areas of the brush which can come in contact with the front guiding area during an intended use for operating the dynamo-electric machine.

12. The dynamo-electric machine according to claim 11, wherein the electrically non-conducting layer of the brush consists of an insulating varnish.

13. A method for manufacturing a brush for a current transfer unit of a dynamo electric machine, the method comprising providing a brush bag; and embossing the brush bag in an area of a front guiding area so as to form a brush bag wherein a distance from a brush to be guided in at least one longitudinal extension located transverse to the brush in the front guiding area of the brush bag is shorter than in a rear guiding area, wherein the front guiding area of the brush bag is in a first plane that lies at a first end of the brush bag, and wherein the rear guiding area of the brush bag is in a second plane that lies at a second end of the brush bag.

14. The brush bag according to claim 1, wherein a first guiding plane formed by the front and rear guiding area of a first wall of the brush bag is inclined with respect to a second guiding plane formed by the front and rear guiding area of a second wall, wherein the second wall is opposite to the first wall.

15. The dynamo-electric machine according to claim 10, wherein a first guiding plane formed by the front and rear guiding area of a first wall of the brush bag is inclined with respect to a second guiding plane formed by the front and rear guiding area of a second wall, wherein the second wall is opposite to the first wall.

* * * * *